(12) United States Patent
Beck et al.

(10) Patent No.: US 6,549,538 B1
(45) Date of Patent: Apr. 15, 2003

(54) COMPUTER METHOD AND APPARATUS FOR MANAGING NETWORK PORTS CLUSTER-WIDE USING A LOOKASIDE LIST

(75) Inventors: Paul R. Beck, Carlisle, MA (US); Larry Cohen, Nashua, NH (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/223,865

(22) Filed: Dec. 31, 1998

(51) Int. Cl.⁷ .............................................. H04L 12/56
(52) U.S. Cl. .................... 370/395.52; 709/245
(58) Field of Search ........................ 370/401, 395.52; 709/245, 246, 249

(56) References Cited

U.S. PATENT DOCUMENTS

| | | | |
|---|---|---|---|
| 4,799,215 A | 1/1989 | Suzuki ........................ 370/60 |
| 4,815,071 A | 3/1989 | Shimizu ...................... 370/60 |
| 4,884,263 A | 11/1989 | Suzuki ........................ 370/16 |
| 5,371,852 A * | 12/1994 | Attanasio et al. |
| 5,790,546 A | 8/1998 | Dobbins et al. ............. 370/400 |
| 5,828,318 A | 10/1998 | Cesar ..................... 340/825.69 |
| 5,862,348 A | 1/1999 | Pederson ................ 395/200.59 |
| 5,918,017 A * | 6/1999 | Attanasio et al. |
| 5,930,259 A | 7/1999 | Katsube et al. ............. 370/409 |
| 5,996,089 A | 11/1999 | Mann ............................ 714/6 |
| 6,006,259 A * | 12/1999 | Adelman et al. ............. 709/223 |
| 6,016,319 A | 1/2000 | Kshirsagar et al. ......... 370/410 |
| 6,044,402 A * | 3/2000 | Jacobson et al. ............ 709/225 |
| 6,061,349 A * | 5/2000 | Coile et al. .................. 370/389 |
| 6,078,957 A | 6/2000 | Adelman et al. ............ 709/224 |
| 6,108,708 A | 8/2000 | Iwata ........................ 709/238 |
| 6,182,224 B1 | 1/2001 | Phillips et al. .............. 713/201 |
| 6,192,411 B1 * | 2/2001 | Chan et al. .................. 709/232 |
| 6,195,680 B1 * | 2/2001 | Goldszmidt et al. ........ 709/203 |
| 6,253,230 B1 | 6/2001 | Couland et al. ............ 709/203 |
| 6,266,335 B1 | 7/2001 | Bhaskaran .................. 370/399 |
| 6,317,775 B1 | 11/2001 | Coile et al. ................. 709/201 |
| 6,324,177 B1 | 11/2001 | Howes et al. ............... 370/389 |
| 6,327,622 B1 | 12/2001 | Jindal et al. ................ 709/228 |
| 6,330,605 B1 * | 12/2001 | Christensen et al. ........ 709/226 |
| 6,335,919 B1 | 1/2002 | Maegawa ................... 370/254 |
| 6,370,584 B1 | 4/2002 | Bestavros et al. .......... 709/238 |

\* cited by examiner

*Primary Examiner*—Ken Vanderpuye
(74) *Attorney, Agent, or Firm*—Hamilton, Brook, Smith & Reynolds, P.C.

(57) ABSTRACT

In accordance with the present invention a method is provided for managing TCP port numbers used by applications running on a cluster. Using that method, ranges of TCP port numbers are locked (reserved) by a processor node of a cluster. An application running on one of those processor nodes uses a locked TCP port number when issuing a data packet that includes the cluster alias address as the source address. With such an invention, applications running on each processor node within a cluster will use unique TCP port numbers when using the cluster alias address. Therefore, connections between a source and destination application can be uniquely registered at the destination processor node using an index formed by a combination of the source address and the TCP port number with the destination address and TCP port number.

20 Claims, 8 Drawing Sheets

US 6,549,538 B1

COMPUTER METHOD AND APPARATUS FOR MANAGING NETWORK PORTS CLUSTER-WIDE USING A LOOKASIDE LIST

BACKGROUND OF THE INVENTION

Generally speaking, computer systems typically include one or more central processor nodes, referred to simply as "processor nodes" or "nodes". Each of those processor nodes includes one or more network interface modules, connected to a computer network, for communicating with other processor nodes. Each network interface module has an associated network layer address or IP address to which packets of information can be directed. The network layer address allows processor nodes to communicate with one another by sending those packets of information across the computer network. Each packet includes a header that contains the network layer addresses of the originating, or source, processor node and of the destination processor node. Groups of processor nodes can be connected in an arrangement referred to as a "cluster". Generally, processor nodes within a cluster are more tightly coupled than in a general network environment and act in concert with one another. For example, all of the processor nodes within a cluster can share a common file system such that they are able to access the same files. Also, each of the processor nodes within the cluster can use the same security domain files such that common user names and passwords may be utilized to log on to any of the processor nodes.

A cluster should appear as a single processor node to clients accessing that cluster. In other words, a cluster should present a common set of software services that can be executed by any of the associated processor nodes. Therefore, regardless of which processor node is accessed by a client, the same services will be provided. Because of that configuration, processor nodes can be seamlessly added to the cluster to increase the capacity of those services without the cluster looking any different to the client.

To make a cluster appear to be a single processor node, it should have a single network layer address. Such a network layer address is referred to as a "cluster alias address". That cluster alias address should not be tied to one specific node within the cluster but rather should be collectively associated with all the processor nodes. To that end, the cluster's network layer address must be accessible regardless of what the current membership of the cluster is. The current membership of a cluster is defined by the nodes that are "up" and capable of running the software services required by any client accessing the cluster. Accordingly, a client accessing the cluster over a network does not need to know which nodes within the cluster are currently up and running in order to access the software services that the cluster provides.

In order to direct incoming data packets, each processor node within the cluster has the ability to distribute those packets to the appropriate processor node for servicing. The processor node receiving the data packet from the network will hereinafter be referred to as the "receiving processor node" for that transaction. When a data packet is received by the cluster, the receiving processor node determines what type of data packet it is. For example, most data packets correspond to the TCP/IP or UDP network protocols. Data packets that are associated with a connection correspond to the TCP/IP protocol. Data packets using the UDP/IP protocol are all treated similar to new connection requests for the purposes of this invention, since the UDP protocol is connectionless. The receiving processor node further determines whether the data packet is associated with an existing connection to an application running on one of the processor nodes within the cluster or whether a new connection should be established. Generally, when a connection is established, it means that an application running on one of the processor nodes of the cluster is dedicated to servicing data packets sent by an associated client application. Also, data can be returned to the client application via the connection.

If the data packet is associated with an existing connection to an application running on a processor node within the cluster, the receiving processor node performs an operation for determining the identity of that processor node. To that end, data packets typically include a header portion that contains information about the existing connection to which it is associated. That header portion includes the network layer address of the processor node from which it was sent, the TCP port number of the application from which it was sent, the network layer address of the destination processor node, the TCP port number of the application running on the destination processor node and the protocol type to which the data packet conforms. The receiving processor node maintains a look-up table of that information for each existing connection within the cluster. That look-up table is referred to as the "connection registration database" or CRD. Each time a new connection is established, the details of that connection are registered in the connection registration database. Typically, the details of a connection stored in the connection registration database are indexed according to a combination of the network layer address of the source processor node and the TCP port number of the source application that is running on that processor node. The index also includes the destination network layer address and the TCP port number of the destination application.

The cluster alias address associated with the source processor node can be identified as the source address in the header portion of a data packet. Such a practice is typically used to simplify the authentication process at the destination processor node when an application running in the cluster is acting as a client to a service on some other node in the network. When the cluster alias address is used as the source address, the authentication table maintained by the destination node needs to include only a single entry for each cluster, as opposed to a single entry for each processor node within that cluster.

When the cluster alias address is identified as the source address, the destination processor can accurately reference the associated connection information in the connection registration database only when the source TCP port number is not being used by any other application running on a processor node within the source cluster. If the same source TCP port number is being used with the cluster alias by another application accessing the same destination node and port number, the index into the connection registration database will not be unique. Accordingly, the information for the associated connections will occupy the same location in the connection registration database and the two connections will look the same to the destination processor node. In that situation, competent passing of data packets between the source cluster and destination node is prevented.

SUMMARY OF THE INVENTION

The foregoing problems of indexing into a connection registration database are overcome by the present invention. In accordance with the invention, a method is provided for managing TCP port numbers used by applications running on a cluster. Using that method, ranges of TCP port numbers are locked by a processor node of a cluster. An application running on one of those processor nodes uses a locked TCP port number when issuing a data packet that includes the cluster alias address as the source address. With such an invention, applications-running on each processor node within a cluster will use unique TCP port numbers. Therefore, connections between a source and destination application can be uniquely registered at the destination processor node using an index that includes a combination of the source address and the TCP port number.

More specifically, the method for managing port numbers includes a lock application that locks, or effectively reserves, a range of port numbers for use by an associated processor node. The port numbers are locked through registration in a lookaside list such that information regarding those locked port numbers is accessible to all of the processor nodes of the cluster. When a lock application begins to lock a range of port numbers, it accesses the lookaside list to determine which ranges of port numbers have already been locked.

The lock application also monitors the number of locked port numbers that have not been allocated to applications. When the number of un-allocated locked port numbers reaches a predetermined threshold, the lock application locks an additional range of port numbers.

With such an invention, a given port number will be used with the cluster alias address by only one application running on the cluster. Accordingly, each combination of port number and cluster alias address is unique to that cluster. Therefore, a TCP connection associated with that application can be uniquely identified by a combination of the cluster alias address and the utilized port number.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not meant to limit the invention to particular mechanisms for carrying out the invention in practice, but rather, are illustrative of certain ways of performing the invention. Other ways of performing the invention will be readily apparent to those skilled in the art.

DETAILED DESCRIPTION OF THE INVENTION

Generally, the present invention provides a method for effectively reserving or so called "locking" ranges of TCP port numbers such that they can be allocated for use by a designated processor node within a cluster. Those locked TCP port numbers can only be used by applications running on the processor node that locked them. Locked TCP port numbers are used by respective applications that indicate the cluster alias address as the source address when sending data packets to other nodes in the network. Because connections, over which the data packets are sent, are identified by a combination of source address and TCP port number, using a locked TCP port number uniquely identifies that connection for purposes of the destination processor node. Accordingly, a processor, node receiving the data packet is able to easily determine which connection, within the destination processor node, is associated with the data packet.

I. Single Processor Node

Figure 1:
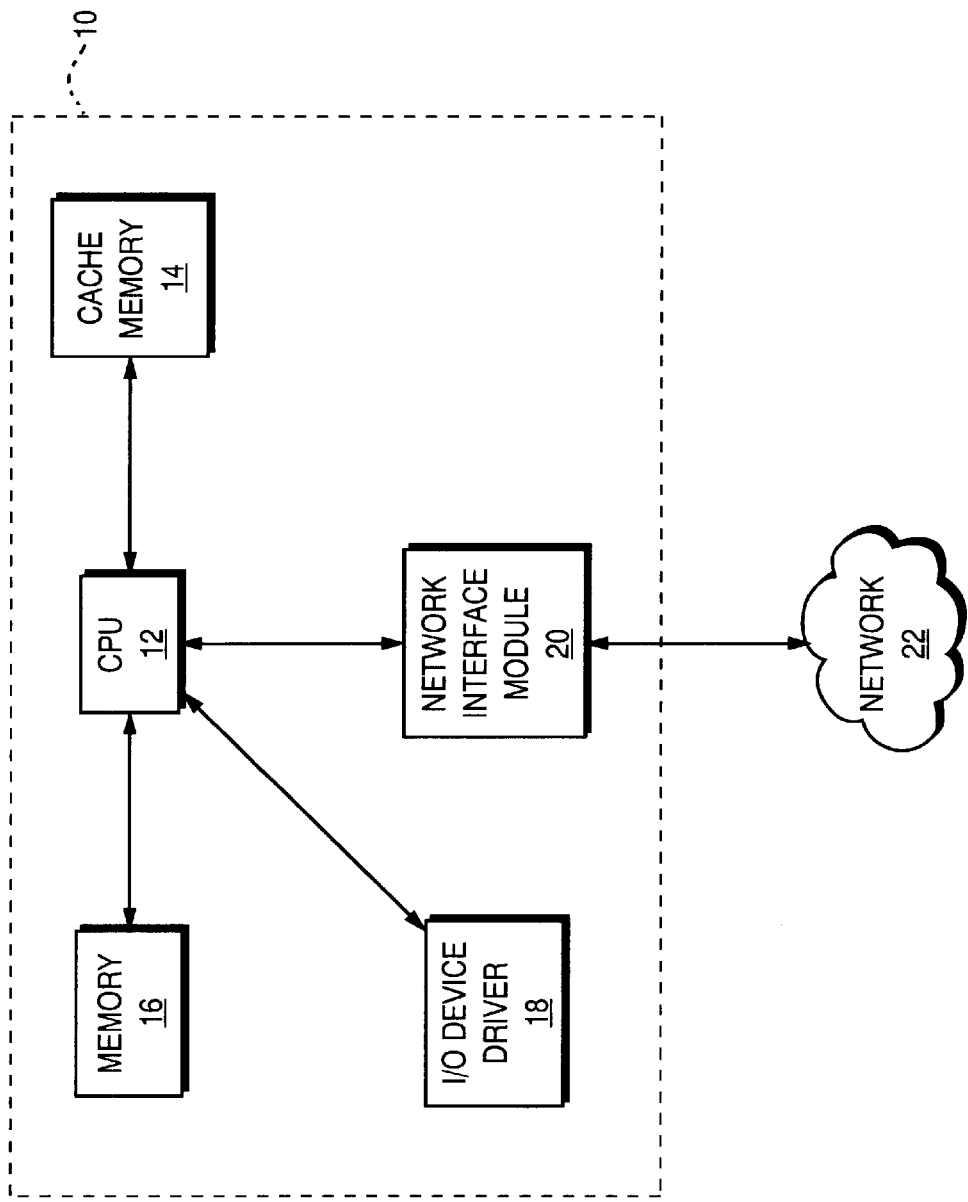
FIG. 1 is a schematic drawing of a single processor node coupled to a network.

Referring now to the drawings, FIG. 1 illustrates a single processor node 10. Processor node 10 includes a central processing unit (CPU) 12 coupled to a cache memory 14, a main memory 16 and an I/O device driver 18. The processor node 10 is coupled to a computer network 22 via network interface module 20. The network interface module 20 has an associated network layer address to which packets of information, transferred on the computer network by other processor nodes, can be directed. The network layer address therefore allows remote processor nodes to communicate with one another through the passing of packets of information across the computer network 22. Each packet includes a header that contains the network layer addresses of the originating processor node and the destination processor node.

II. Clusters of Processor Nodes

Figure 2:
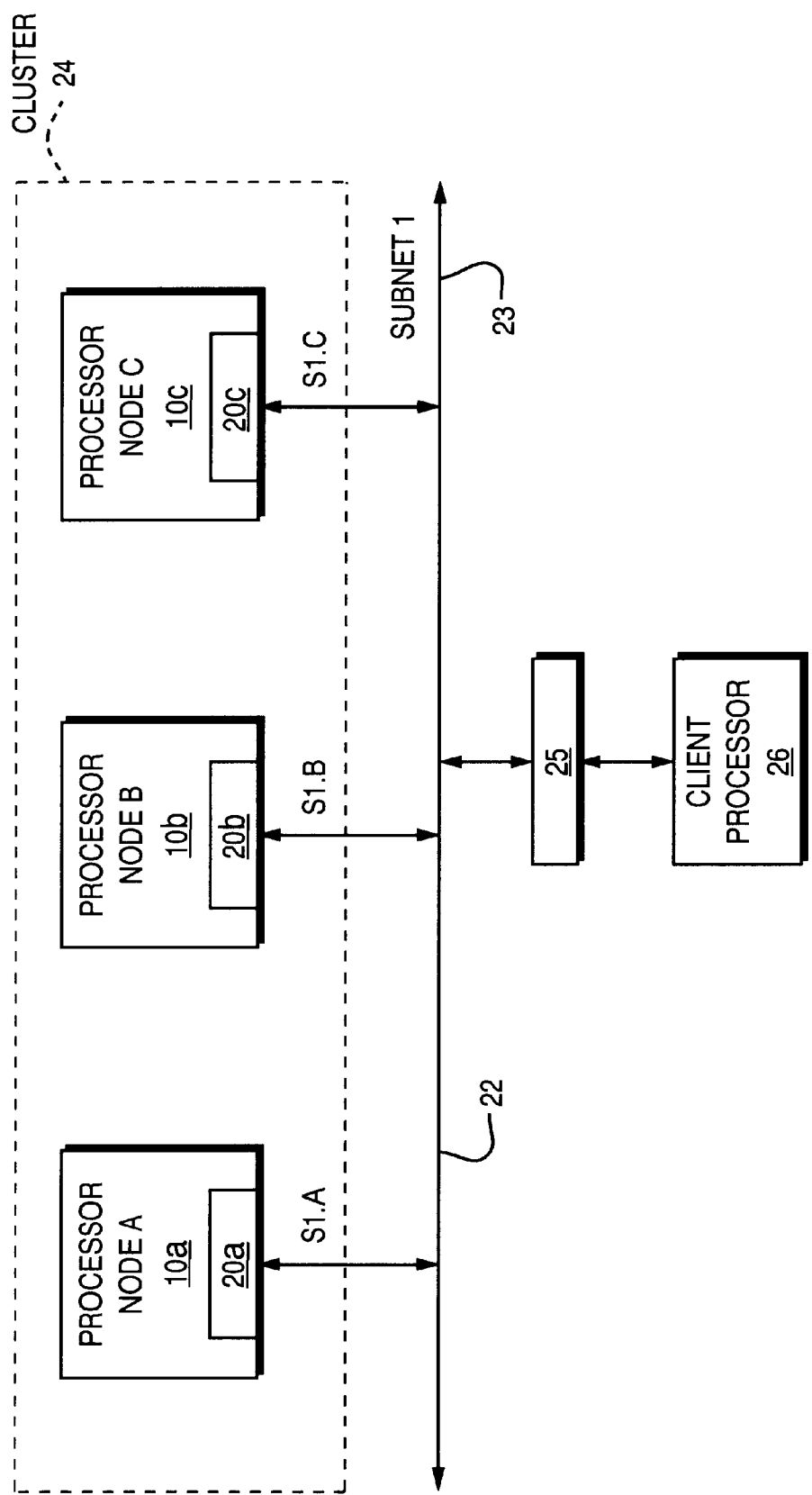
FIG. 2 is a schematic drawing depicting a number of processor nodes of FIG. 1 arranged in a cluster.

Referring now to FIG. 2, a group of processor nodes are shown connected in an arrangement referred to as a "cluster" 24. A cluster 24 is a collection of processor nodes tightly coupled via a computer network and acting in concert with one another. Processor nodes 10a–10c are shown connected together via network interfaces 20a–20c and via the computer network 22. The indicated portion of computer network 22 is referred to as a subnet, and in this case "subnet 1". Each of the processor nodes 10a–10c are referred to as Processor nodes A–C and, for illustration purposes, have thirty-two bit network layer (or IP) addresses S1.A, S1.B and S1.C, respectively. Further, a client processor node 26 is also shown connected to computer network 22 via an intermediate connection module 25, such as a network router.

Cluster 24 is associated with a single network layer address such that it appears as a single processor node to a node 26 located outside the cluster, i.e. on the other side of connection module 25. That network layer address is associated with all the processor nodes 10a–10c in the cluster 24 and is referred to as a "cluster alias address". Using the cluster alias address, data packets can be directed to a specific cluster of processor nodes. However, the cluster alias address does not specify the processor node within the cluster to which the data packet should be directed. Therefore, in order to direct incoming data packets to the processor nodes that have established connections with the associated source applications, each processor node has the ability to distribute those data packets within the cluster. The processor node and application receiving the data packets will hereinafter be referred to as the "receiving processor node" and "receiver application," respectively.

III. Data Transfer VIA a Connection

Data packets that are transferred between processor nodes within a network are typically associated with a virtual circuit referred to as a connection. A connection is a construct that is established by both the source processor node and the destination processor node for exchanging data via data packets. More specifically, the connection is established by applications running on the source and destination processor nodes. When an application program running on the source processor node requires a service provided by another node, it sends an initial data packet to that node's IP address. Such data packets that arrive at node 26 include a TCP/IP header portion 30 which contains information regarding an associated connection to a processor node, if such connection exists. For the purposes of this document, assume that cluster 24 is acting as a client and establishing a connection with node 26.

Figure 3:
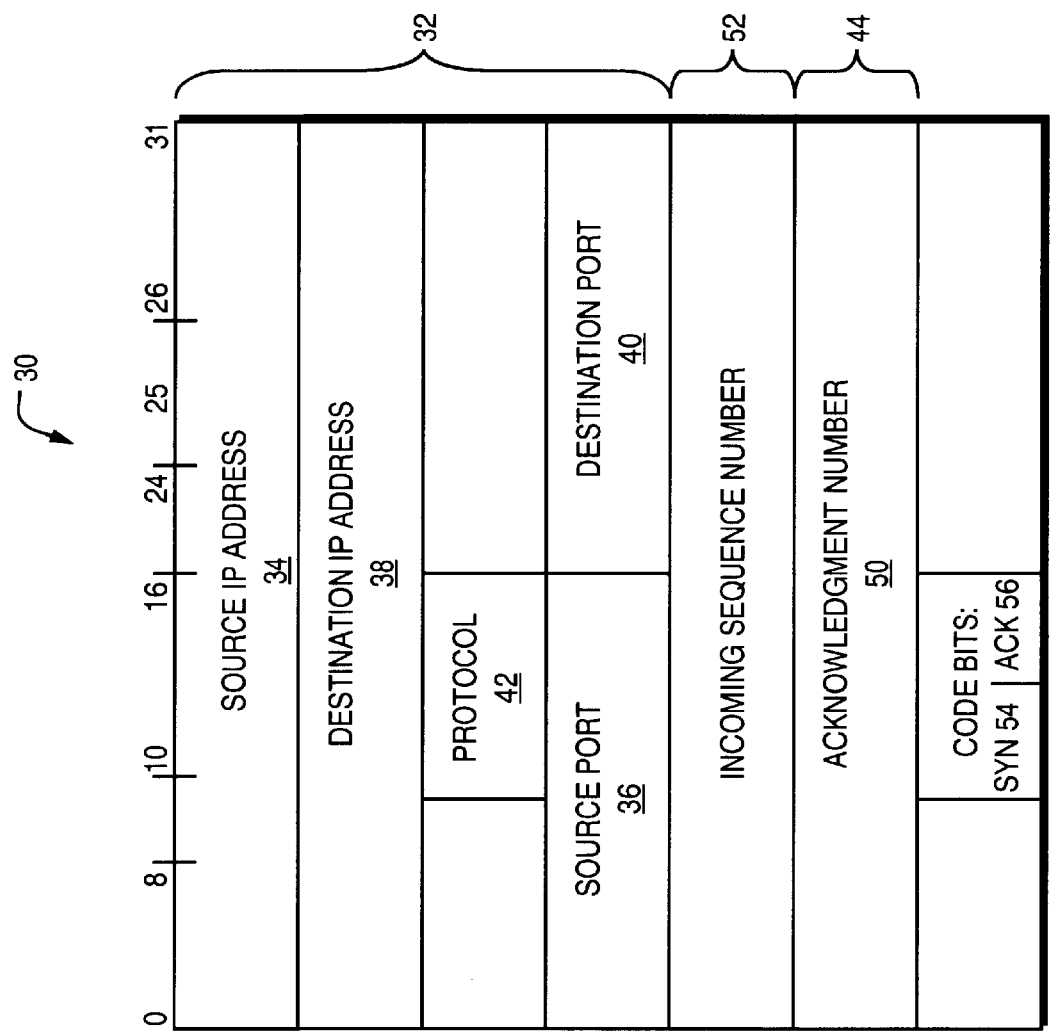
FIG. 3 is a block diagram of a TCP/IP header of a data packet issued from the cluster of FIG. 2.

Referring now to FIG. 3, the configuration of the TCP/IP header information is depicted. In a first portion 32 of TCP/IP header 30, the aforementioned connection is identified by several fields, collectively referred to as the "five-tuple". The source IP address field 34 identifies the thirty-two bit network layer address of the processor node, or cluster alias address of the cluster, that sent the associated data packet to node 26. The destination IP address field 38 identifies the thirty-two bit network layer address of the intended destination processor node or node 26. The next portion of the TCP/IP header 30 is referred to as the source port field 36. The source port field 36 identifies the TCP port number associated with the application on the source processor node that generated and sent the data packet. The source port field 36 contains a port number that is assigned only for as long as the connection exists. When the connection is closed, such as when an entire data file has been successfully transferred, the port number is deallocated. Likewise, the TCP port number used by the application running on the destination processor node is stored in the destination port field 40. Also, the protocol being used by the associated data packet is represented by an eight bit value that is stored in the "Protocol" field 42.

The TCP/IP header 30 further includes an incoming sequence number field 52 and an acknowledgment, or outgoing sequence number field 44, collectively referred to as the "sequence number fields." The sequence number fields 52 and 44 are typically used to order data packets that are associated with a fragmented data transfer. In addition, the sequence number fields 52 and 44 are used to confirm that all such data packets successfully arrived at the destination processor node.

More specifically, data to be transferred from one node or cluster to another will be fragmented into many data packets that are independently transferred. Sequential numbers are stored in the sequence number fields 52 and 44 of each data packet header to indicate the relative position of that data packet within the transfer. Although some packets may arrive at the destination processor node out of order, the total number of data packets must arrive for a successful data transmission to occur. By monitoring the sequence numbers from the sequence number fields 52 and 44 of each data packet, a destination processor node can determine whether all the data has been transferred that was intended to be transferred.

The header also includes a number of code bits, one of which is referred to as the "synchronize sequence numbers" or "SYN" bit 54. The source processor node sets the SYN bit 54 before it sends the initial data packet to the destination node address to request establishment of a new connection. Another code bit, referred to as the "acknowledgment valid" or "ACK" bit 56 is also included in the header.

When the source application initiates the connection, it selects or "binds" to a TCP port number. Responsively, when the receiver application is started and listens for incoming connection requests, it also binds to a TCP port number that corresponds to the service being provided. The TCP port numbers essentially help to designate queues into which arriving data packets are placed for service by an application running on that processor node.

Figure 4:
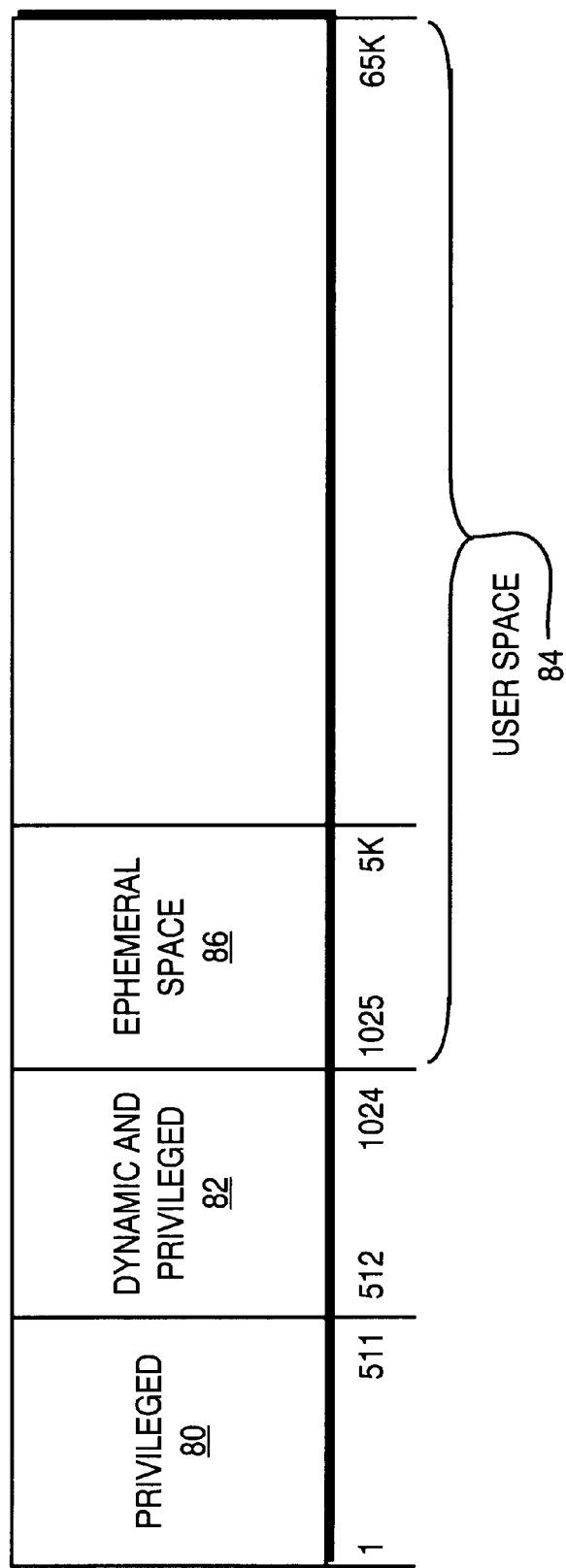
FIG. 4 is an illustration of TCP port ranges used by applications running on the cluster shown in FIG. 2.

Referring now to FIG. 4, a block diagram is shown that illustrates several categories of TCP port numbers maintained by each node. Those categories are associated with contiguous ranges of TCP port numbers. In the computer system of the present invention, TCP port numbers from 1 to 511 are referred to as "privileged" 80 and TCP port numbers in the range from 512 to 1024 are referred to as "dynamic and privileged" 82. Only applications that have been assigned root privileges by the operating system can bind to TCP port numbers in those ranges. Finally, TCP port numbers from 1025 to 65 K are referred to as being in the "user space" 84. TCP ports that are within the user space can be bound by applications having user privileges, to establish new connections. An application can designate a specific TCP port within that range or can request that a TCP port number is selected for it.

A user application requests the selection of a TCP port number by executing a bind application, which is actually a system service or API, and issuing a request to bind to TCP port number zero. Because TCP port zero does not exist, the bind application chooses a TCP port number from a moveable range within the user space 84. That moveable range, referred to as the "ephemeral port space" 86, typically contains TCP port numbers from 1025–5 K. An ephemeral port number is used by an application only for the duration of an associated connection. Once that connection is closed, the ephemeral port number is relinquished. For perspective purposes, it should be noted that while ephemeral port numbers are used for transitory connections, other TCP port numbers, considered "well-known" ports, can be permanently reserved such as the port numbers used for electronic mail and FTP applications.

When a connection is established which uses a cluster alias address, each processor node in the cluster maintains information identifying that connection in a connection registration database. Information contained in the connection registration database includes the local port, the local IP address (the cluster alias), the remote port, the remote IP address, and a Host ID indicating which processor node in the cluster owns the connection.

Figure 5:
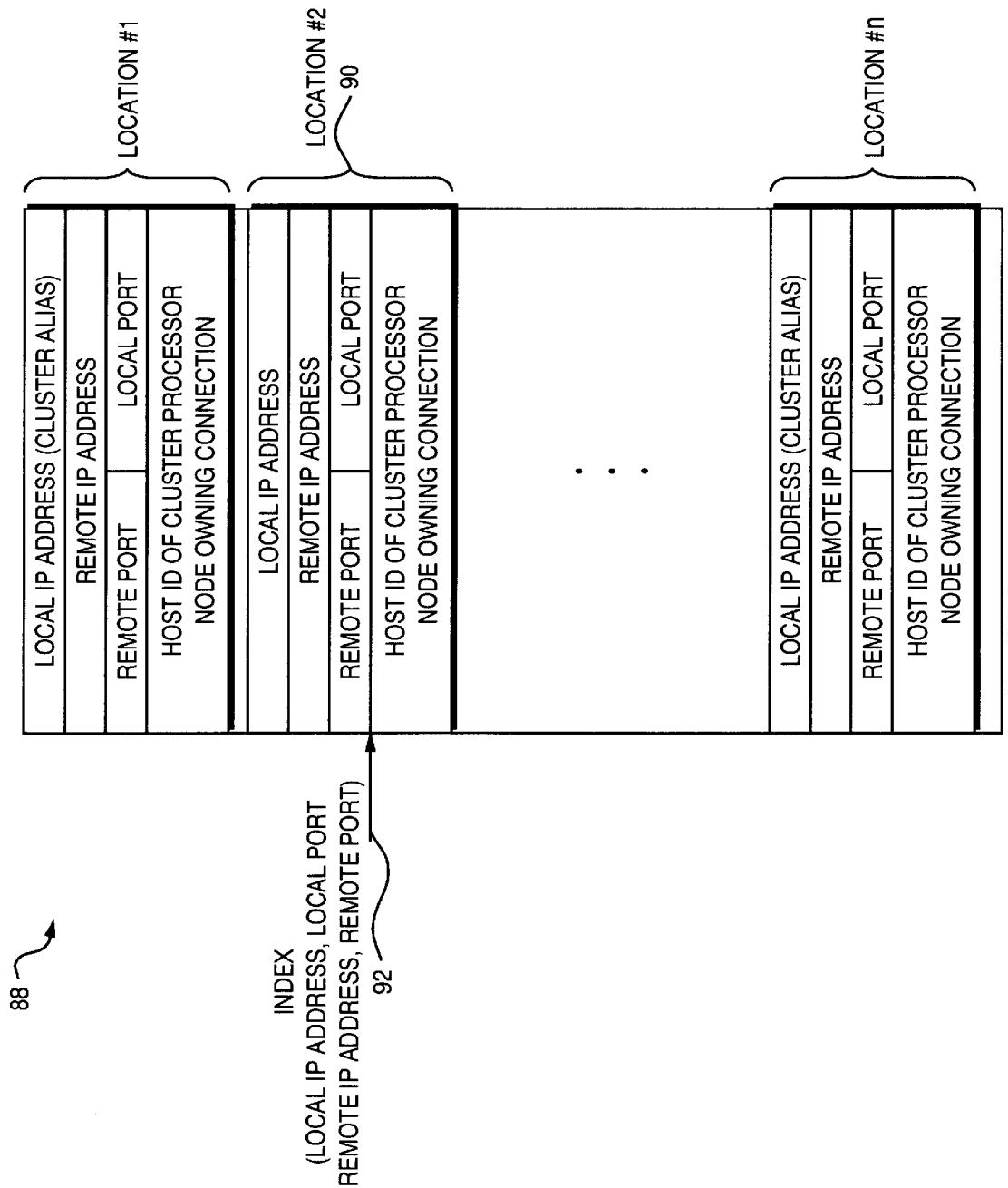
FIG. 5 is a block diagram of a connection registration database.
Figure 6:
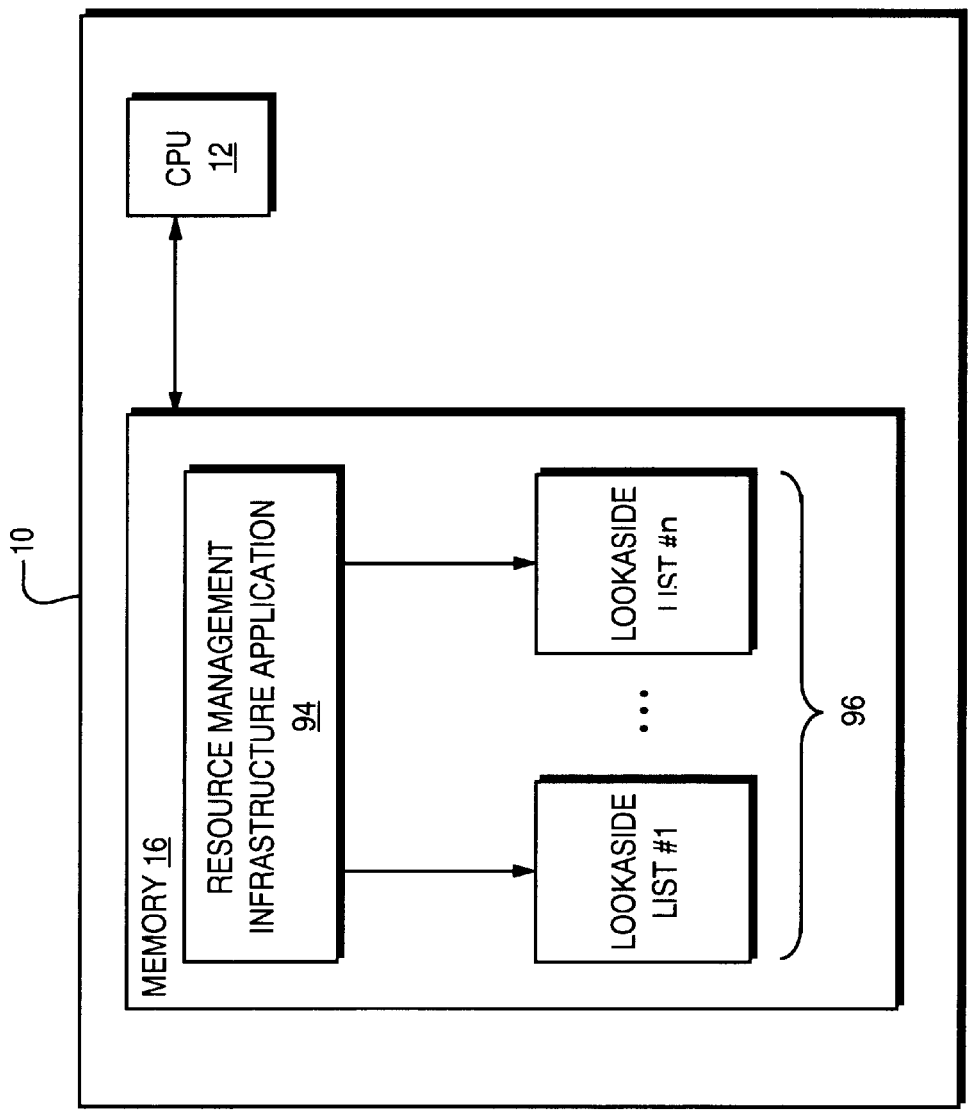
FIG. 6 is a block diagram of a resource management infrastructure application and the associated lookaside lists residing in the memory subsystem of the processor node of FIG. 1.

Referring now to FIG. 5, such a connection registration database 88 is illustrated. More specifically, the destination processor node stores the aforementioned five-tuple 32 at a location 90 within the connection registration database 88. That location 90 is identified by an index 92 that includes a combination of the source IP address 34 (FIG. 3) and the TCP port number 36 (FIG. 3) to which the source application is bound. Accordingly, when a data packet is sent to a cluster alias address, a receiver application running on a processor node within that cluster accesses the connection registration database 88 as follows. The receiver application extracts the header from the received data packet and uses the local and remote IP addresses and port numbers to match the same fields with entries in the connection database 88. When the matching entry is found, the Host ID from the connection database entry is used to transfer that data packet to the processor node in the cluster that is running the copy of the application that has an established connection with the source application.

This operation requires that the combination of local IP address, local port, remote IP address, and remote port be unique. In the absence of a cluster alias address, this combination is unique because the source port is uniquely assigned to the connection on the source node, so that only one connection associated with the source IP address will be paired with that port number. By contrast, the destination port number is usually a "well-known" port number identifying the application being requested, so that the pairing of the destination port number and destination IP address is generally not unique.

Such an operation executes properly when the network layer address of the source processor node, rather than its cluster alias address, is included in the source IP address field 34 (FIG. 3) of the data packet used to establish the connection. In other words, since each processor node has a unique network layer address, the combination of the network layer address of the source processor node and any TCP port number will be unique, i.e. it will identify a single location in the connection registration database 88.

By contrast, the source processor node's cluster alias address is not unique since it is associated with all processor nodes within the cluster. Therefore, when a cluster alias address is included in the source IP address field 34 of a data packet that is used to establish a new connection, the index into the destination cluster's connection registration database is only unique if the TCP port number is unique among all processor nodes in the cluster.

Accordingly, the present invention locks or reserves a portion of the ephemeral TCP port numbers 86, such that they can only be utilized by applications running on the associated processor node. Therefore, those locked ephemeral TCP port numbers can only be used by one processor node within a cluster at a time. Hence, as formed by the combination of the source IP address field 34 and one of the locked ephemeral TCP port numbers, the associated index 92 into the connection registration database 88 is unique.

IV. Maintaining TCP Port Numbers in a Lookaside List

Each processor node within the cluster has a background application, or thread, that is used to lock ranges of ephemeral TCP port numbers 86 for exclusive use by applications running on that processor node. When a user application attempts to bind to TCP port zero, the bind application allocates a TCP port number from the locked range of ephemeral TCP port numbers 86.

The above mentioned background thread operates in conjunction with a "resource management infrastructure application" 94 to lock those TCP port numbers. Every cluster includes a resource management infrastructure application 94 for tracking resources that are used cluster-wide. That resource management infrastructure application allows each processor node within the cluster to retrieve information regarding resources that are shared between processor nodes. For example, in the present embodiment of the invention, the locked ephemeral TCP port numbers are designated as shared resources. Once a range of port numbers is locked, every other processor node in the cluster will be able to retrieve information regarding that range via the resource management infrastructure application 94. When information concerning a shared resource is maintained by that application, the shared resource is referred to as being registered in a lookaside list 96.

It should be noted that, in the present embodiment, Digital UMX is running on the processor nodes of the cluster. Therefore, the resource management infrastructure application 94 is the "kernel group services" application. However, the present invention is not limited to operating with the "kernel group services" application but rather may be used with any resource management infrastructure application which provides for reliable updating of shared information among multiple nodes, such as a two-phase commit transaction management system.

When a source application, running on a processor node within the cluster, attempts to bind to TCP port zero, the bind application allocates a previously un-allocated ephemeral TCP port number from those registered in the associated lookaside list 96. The number of un-allocated ephemeral TCP port numbers contained in the lookaside list 96 is tracked by the background thread. When the number of un-allocated ephemeral TCP port numbers is decreased to a predetermined threshold, the background thread locks and registers another range for applications running on the associated processor node to use. It should be noted that a cluster-wide distributed semaphore is utilized such that two background threads cannot lock the same range of ephemeral TCP port numbers 86. Accordingly, when a background thread needs to lock a new range of ephemeral TCP port numbers, it issues a cluster wide message indicating that it is about to perform a lock operation. The lock operation is performed only after every other processor node acknowledges that message. Allocating multiple ports as a background operation substantially reduces the per-port overhead associated with this distributed semaphore processing.

Figure 7A:
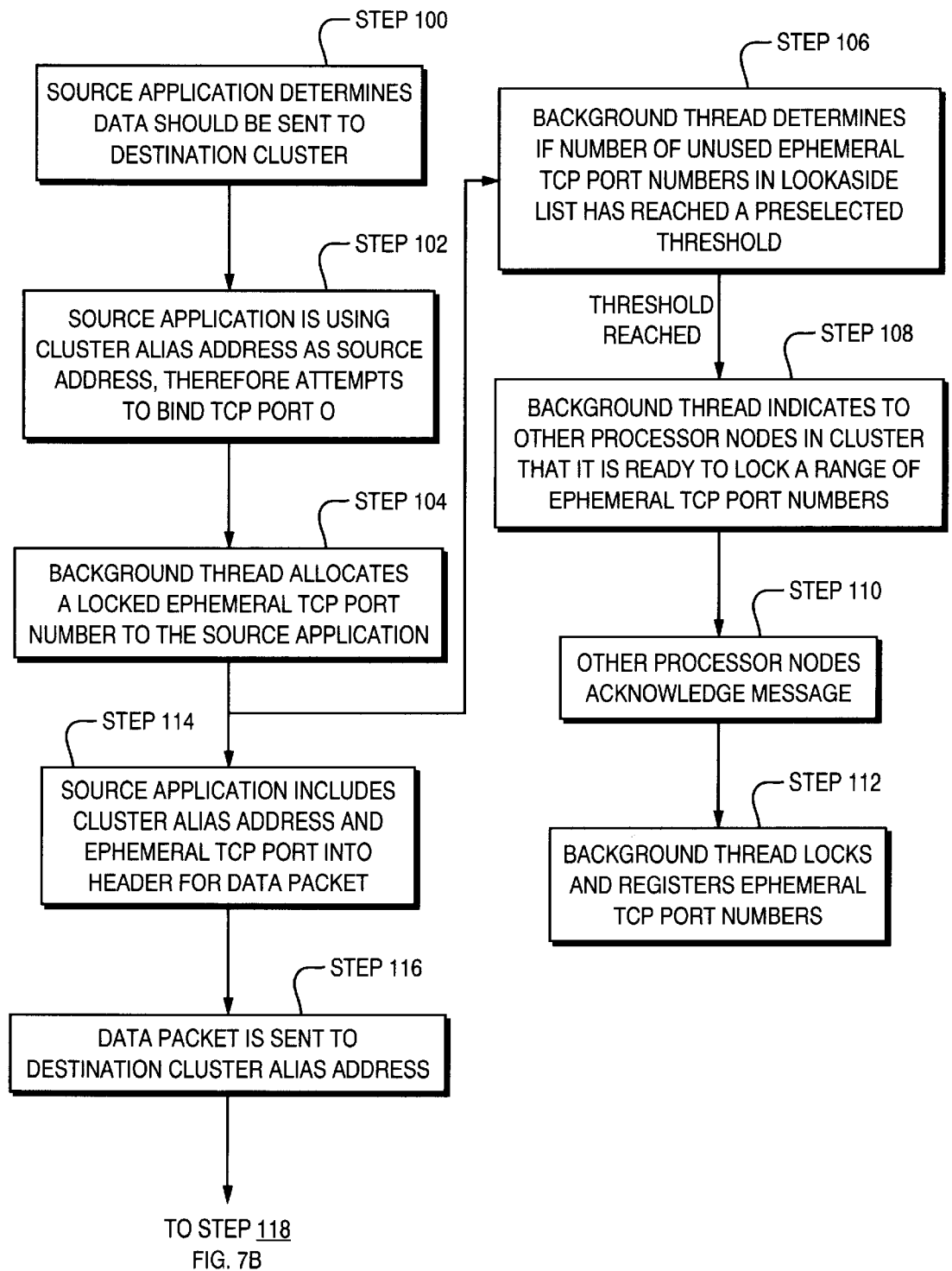
FIGS. 7A and 7B are flow diagrams depicting the operation of the present invention running on a processor node of the cluster shown in FIG. 2.
Figure 7B:
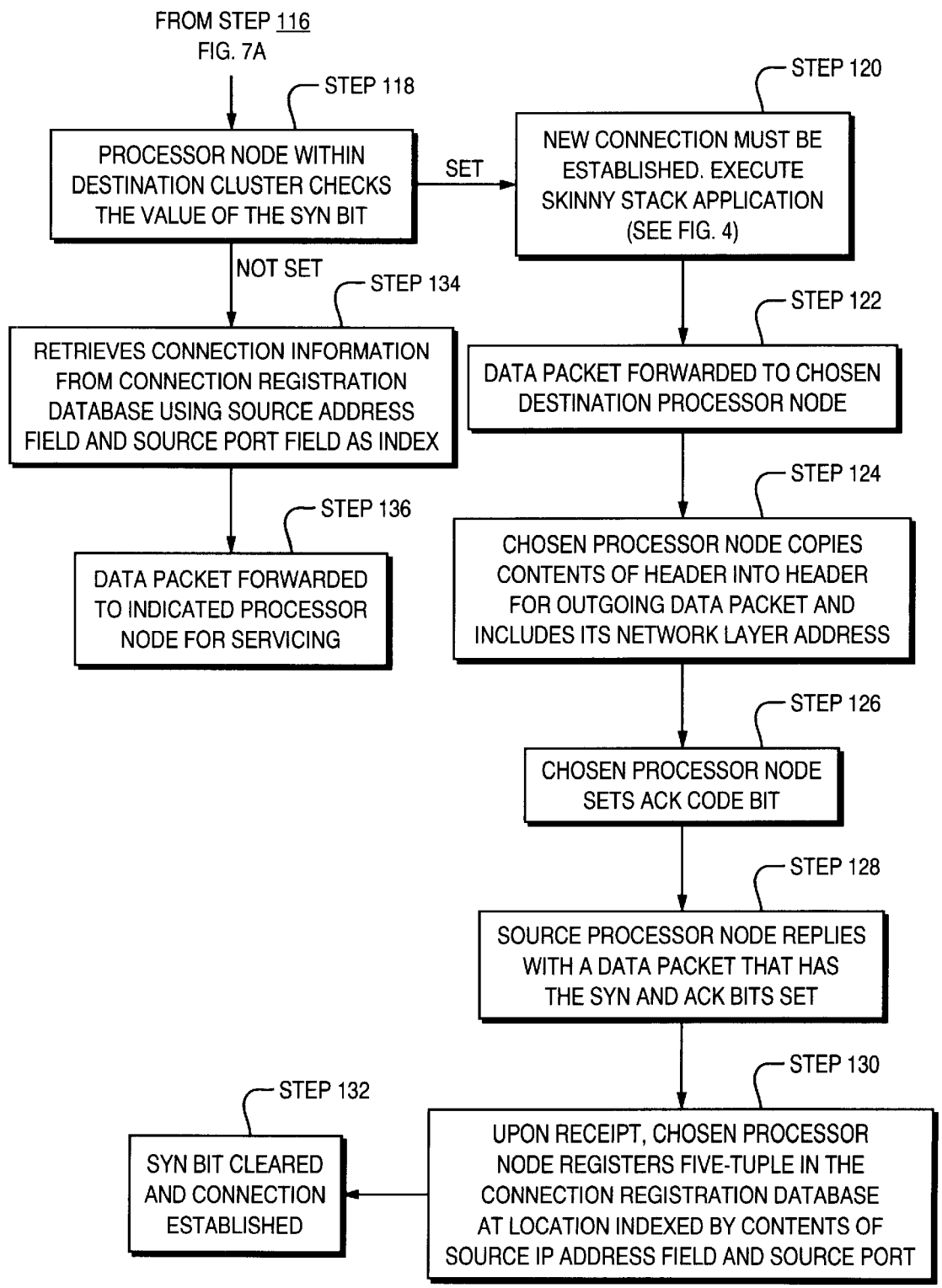

FIGS. 7A and 7B are flow diagrams illustrating the handling of an outgoing data packet. For illustration purposes, consider that a source application running in cluster 24 determines that data should be sent to a destination application running on a destination processor node (Step 100). The source application intends to use the cluster alias address as the source IP address 34 in the data packet header 30. Accordingly, the source application issues a command to bind to TCP port zero, indicating that the bind application should choose a locked ephemeral TCP port number (Step 102). The bind application responsively allocates one of the locked ephemeral TCP port numbers to the source application (Step 104). After that TCP port number is allocated, the background thread determines if the number of un-allocated ephemeral TCP port numbers in the associated lookaside list has reached a preselected threshold (Step 106). If the threshold has been reached, the background thread issues a message to the other processor nodes in the cluster indicating that it is ready to lock a range of ephemeral TCP port numbers (Step 108). When those processor nodes acknowledge the message (Step 110), the background thread locks and registers the chosen range of ephemeral TCP port numbers in a lookaside list (Step 112). While the background thread performs the lock operations, the source application configures the header for the outgoing data packet. The source application sets the SYN bit 54, incorporates the associated cluster alias address in the source IP address field 34, incorporates the cluster alias of the destination processor node in the destination IP address field 38 and includes the selected TCP port in the source port field 36 (Step 114). Once the header is configured, the source application sends the data packet to the network layer address of the destination node (Step 116). The source processor node in the cluster also causes the 5-tuple designating the connection being requested to be registered in the cluster's connection registration database. This is to allow returning data packets (such as those used to confirm the connection) to be correctly directed to the source processor node within the cluster.

The destination processor node determines whether the SYN bit 54 in the data packet header is set (Step 118) as illustrated in FIG. 7B. When the SYN bit 54 is set, as in the present situation, a new connection needs to be established. Responsively, an application running on the destination processor node copies the source IP address 34 and source port number 36, contained in the received data packet header 30, into the corresponding fields of an outgoing data packet. That application further includes its network layer address in the source IP address field 34 and the associated port number in the source port field 36 of the outgoing data packet header (Step 124). The processor node also sets the ACK bit 56 (Step 126).

The data packet is returned, via the network, to cluster 24. Because multiple processor nodes in the cluster may respond to the cluster alias address, the data packet may not arrive at the same processor node that originated the connection. Accordingly, the receiving processor node will use the information contained in the source IP address field 34 and the source port field 36 of the header 30 to access the connection registration database 88, and forward the packet to the source processor node within the cluster. The source application responds by issuing a data packet that has both the SYN 54 and ACK 56 bits set (Step 128). Subsequently, the SYN bit 54 will be cleared to indicate that an associated connection has been established (Step 132).

When any subsequent data packet that is part of this connection is sent to the source processor node's cluster alias address, the receiving processor node must determine which processor node within the cluster should handle the packet. Accordingly, the receiving processor node will use the information contained in the source IP address field 34 and the source port field 36 of the header 30 to access the connection registration database 88 (Step 134). Because the source application's ephemeral TCP port was uniquely allocated, the connection information is accurately indexed and the data packet can be forwarded to the appropriate processor node for servicing (Step 136).

Therefore, locking a range of ephemeral TCP port numbers 86 for exclusive use by applications executing on an associated processor node allows source applications to use cluster alias addresses as source IP addresses for data packets sent from the cluster to other nodes in the network. In such a manner, data packets can be competently handled by receiving processor nodes that maintain a connection registration data base 88. Therefore, when a connection using a locked port is terminated, the locked port is entered into a lookaside list of ports to be unlocked. A background thread executes periodically, taking the list of ports to be unlocked and using a cluster-wide semaphore to inform the other processor nodes in the cluster that this set of ports is no longer locked by this processor node. Additionally, if a locked port is assigned to an application, and that application subsequently binds that port to a connection that does not use the cluster alias IP address as its source address, the locked port will be "unlocked" by entering it into the lookaside list of ports to be unlocked. This is because a connection using a local IP address of the processor node instead of the cluster alias is not at risk of conflicting with another node in the cluster using the same port number, since the local IP address is unique for each processor node.

While this invention has been particularly shown and described with references to preferred embodiments thereof, it will be understood by those skilled in the art that various form changes and details may be made therein without departing from the spirit and scope of the invention as defined by the appended claims.

What is claimed is:

1. A method for managing port numbers designated for use by applications executing on processor nodes of a cluster, said method including the steps of:

providing a range of available port numbers;

registering a subset of the port numbers, from the range of available port numbers, in a lookaside list such that the subset forms a locked range of port numbers and wherein information regarding the locked range of port numbers is accessible by all of the processor nodes of the cluster through the lookaside list, said information indicating which locked port numbers can only be used by applications running on a certain processor node of the cluster; and selecting port numbers from the locked range of port numbers using a lock application running on a processor node of the cluster.

2. A method for managing port numbers as described in claim 1, further including the steps of:

issuing a selection request, by a first application executing on a first processor node of the cluster; and allocating a first locked port number, from the locked range of port numbers, to the first application running on said first processor node of the cluster in response to the selection request from said first application, said first locked port number being allocated to said first application such that said first application can use an associated cluster alias address as a source address for a data packet that is to be issued by said first application.

3. A method for managing port numbers as described in claim 2, further including the steps of:

establishing a connection between the first application running on said first processor node of the cluster and a second application running on a second processor node outside of the cluster by issuing the data packet to the second application; and storing information identifying the connection in a database maintained by the second processor node, said information being stored at a location that is indexed by a combination of said source address of the data packet and the first locked port number.

4. A method for managing port numbers as described in claim 3, further including the steps of:

monitoring, by the lock application, a number of the locked port numbers that have not been allocated to the applications executing on the processor nodes of the cluster, said number being a number of un-allocated port numbers; and locking, by the lock application, an additional range of the available port numbers when the number of un-allocated port numbers is reduced to a predetermined threshold number.

5. A method for managing port numbers as described in claim 4, wherein said first locked port number is allocated to the first application executing on said first processor node in response to the first one of said applications issuing an allocation request for a specified port number.

6. A method for managing port numbers as described in claim 5, wherein the specified port number is port zero.

7. A method for managing port numbers as described in claim 1 wherein the range of available port numbers is a portion of the TCP ephemeral port number space.

8. A method for managing port numbers as described in claim 1 wherein each of the processor nodes of the cluster are running the Digital UNIX operating system.

9. A method for managing port numbers as described in claim 8 wherein the locked port numbers are registered in the lookaside list by a cluster resource management application in response to a request from the lock application.

10. A method for managing port numbers as described in claim 9 wherein the cluster resource management application is the kernel group services application of the Digital UNIX operating system.

11. A computer program product for managing port numbers of a cluster having a plurality of system resources including processor nodes, shared memory and I/O circuitry through which the plurality of system resources are electrically connected and through which data packets can be exchanged with other clusters, the computer program product comprising a computer usable medium having computer readable program code thereon, including:

program code that establishes a group of unique port numbers dedicated for use by an associated one of the processor nodes of the cluster, the group of unique port numbers being registered in a lookaside list such that the group forms a locked range of port numbers;

program code that allocates a port number from the locked range of port numbers to an application executing on the one processor node;

program code for establishing a connection between the application running on the one processor node and an application running on a processor node of another cluster; and program code for storing information identifying the connection in a database location that is indexed by a combination of an address of the one processor node and the allocated port number, such that a data packet returning across that connection can be delivered to the application executing on the one processor node by any processor node of the cluster receiving the data packet.

12. A computer program product according to claim 11 further including:

program code for monitoring a number of the locked range of port numbers that are not allocated to applications executing on the one processor node, said number being a number of un-allocated port numbers; and program code for adding additional unique port numbers to the group of unique port numbers when the number of un-allocated port numbers is reduced to a predetermined threshold.

13. A computer program product according to claim 12 wherein the program code that establishes the group of unique port numbers stores that group of unique port numbers in a lookaside list, the lookaside list being accessible by each of the processor nodes of the cluster.

14. A computer program product according to claim 13 wherein the program code that allocates a port number from the locked range of port numbers does so in response to the application issuing a request for a specified port number to be allocated to it.

15. A computer program product according to claim 14 wherein the specified port number is port number zero.

16. A computer system, comprising a plurality of processor nodes, comprising a cluster;

a database, accessible by each of the processor nodes of the cluster, including a range of available port numbers; and a first processor node, of the plurality of processor nodes, for executing a first application that registers a subset of the port numbers, from the range of available port numbers, in a lookaside list such that the subset forms a locked range of port numbers and wherein information regarding the locked range of port numbers is accessible by all of the processor nodes of the cluster through the lookaside list, said information indicating which locked port numbers can only be used by applications running on a certain processor node of the cluster.

17. The computer system described in claim 16, wherein the first application executing on the first processor node, allocates a first locked port number, from the locked range of port numbers, to a second application executing on the first processor node in response to a selection request issued by the second application, the first locked port number being allocated to the second application such that the second application can use an associated cluster alias address as a source address for a data packet that is to be issued by the second application.

18. The computer system described in claim 17, wherein the first application monitors a number of the locked port numbers that have not been allocated to applications executing on the first processor node and registers an additional subset of the available port numbers when the number of un-allocated port numbers is reduced to a predetermined threshold number.

19. The computer system described in claim 18, wherein the first locked port number is allocated to the second application executing on the first processor node in response to the second application issuing an allocation request for TCP port zero.

20. The computer system described in claim 19, wherein each of the plurality of processor nodes is running the Digital UNIX operating system.

\* \* \* \* \*